United States Patent [19]
Kim et al.

[11] Patent Number: 5,862,204
[45] Date of Patent: Jan. 19, 1999

[54] RARE PROBABILITY CONNECTION CALL REGISTRATION METHOD USING INCOMPLETE CALL CAUSATION MESSAGE FOR ASYNCHRONOUS TRANSFER MODE SWITCHING SYSTEM

[75] Inventors: Chul-Soo Kim; Hun-Ju Jung; Hae-Sook Kim, all of Daejeon, Rep. of Korea

[73] Assignees: Electronics and Telecommunications Research Institute, Daejeon; Korea Telecommunication Authority, Seoul, both of Rep. of Korea

[21] Appl. No.: 763,107

[22] Filed: Dec. 10, 1996

[30] Foreign Application Priority Data

Sep. 4, 1996 [KR] Rep. of Korea ................ 1996 38262

[51] Int. Cl.$^6$ .................................................. H04M 15/00
[52] U.S. Cl. ....................... 379/134; 379/113; 370/229; 370/395
[58] Field of Search ..................... 379/111, 112, 379/113, 115, 133, 134, 139, 223, 224, 137, 138; 370/229, 395

[56] References Cited

U.S. PATENT DOCUMENTS

| | | | |
|---|---|---|---|
| 4,907,256 | 3/1990 | Higuchi et al. | 379/137 |
| 5,042,064 | 8/1991 | Chung et al. | 379/113 |
| 5,197,127 | 3/1993 | Waclawsky et al. | 370/229 |
| 5,359,649 | 10/1994 | Rosu et al. | 379/220 |
| 5,425,086 | 6/1995 | Hidaka et al. | 379/113 |
| 5,719,853 | 2/1998 | Ikeda | 370/229 |
| 5,748,900 | 5/1998 | Scott et al. | 370/229 |

*Primary Examiner*—Curtis A. Kuntz
*Assistant Examiner*—Binh K. Tieu
*Attorney, Agent, or Firm*—Antonelli, Terry, Stout & Kraus, LLP

[57] ABSTRACT

An improved rare probability connection call registration method using an incomplete call causation message for an asynchronous transfer mode switching system, which includes the steps of receiving a candidate code from an operator and classifying a normal call and an abnormal call with respect to each call when a call cause message is received, increasing the number of completed calls when the received call is normally completed, and judging whether an incomplete call occurred due to the lack of a switching resource or the busy state of the subscriber at a destination in the case of the abnormal call, terminating the call when the cause of the abnormal call is due to another cause except for the lack of the switching resource, or the on-busy of the subscriber, increasing the number of the incomplete calls when the call is incompletely terminated due to the lack of the switching resource or the on-busy of the subscriber, and checking the call completion ratio, and terminating the call when the call completion ratio is greater than a predetermined threshold value that the operator designated, registering the call as the RPCC, informing the resultant operation of the operator terminal, and requesting a call control with respect to the corresponding code.

3 Claims, 8 Drawing Sheets

| CN | Cause | Q. 2610 | Remarks | RPCC reference call |
|---|---|---|---|---|
| C000 | Normal call clearing | | | |
| 1 | Unallocated(unassigned)number | Unallocated(unassigned)number | Cause at transmission side | |
| 2 | No route to specified transit network | No route to specified transit network | Cause at transmission side | |
| 3 | No route to destination | No route to destination | | |
| 4 | Send special information tone | Send special information tone | | |
| 5 | Misdialled trunk prefix | Misdialled trunk prefix | | |
| 6 | Channel unacceptable | Channel unacceptable | | |
| 7 | call awarded and being delivered in an established channel | call awarded and being delivered in an established channel | | |
| 10 | VPI/VCI unacceptable | VPI/VCI unacceptable | | |
| 16 | Normal call clearing | Normal call clearing | Normal call | |
| 17 | User busy | User busy | Cause at receiving side | 0 |
| 18 | No user responding | No user responding | Cause at receiving side | |
| 19 | No answer from user(user alerted) | No answer from user(user alerted) | Cause at receiving side | |
| 21 | Call rejected | Call rejected | Cause at receiving side | 0 |
| 22 | Number changed | Number changed | Cause at receiving side | |
| 26 | Non-selected user clearing | Non-selected user clearing | | |
| 27 | Destination out of order | Destination out of order | Cause at receiving side | 0 |
| 28 | Invalid number format(address incomplete) | Invalid number format(address incomplete) | | |
| 29 | Facility rejected | Facility rejected | Cause at receiving side | |
| 30 | Response to STATUS ENQUIRY | Response to STATUS ENQUIRY | | |
| 31 | Normal, unspecified | Normal, unspecified | Other cause | |

FIG. 3B

| | | | | 2R |
|---|---|---|---|---|
| C01 0 | Resource unavaliable | | | |
| 32 | Too many pending add party requests | Too many pending add party requests | S-resource lack | 0 |
| 34 | No circuit/channel available | No circuit/channel available | S-resource lack | 0 |
| 35 | Request VPCI/VCI not available | Request VPCI/VCI not available | unused resource request | 0 |
| 36 | VPI/VCI assignment failure | VPI/VCI assignment failure | S-error | 0 |
| 37 | User cell rate not available | User cell rate not available | S-resource lack | 0 |
| 38 | Network out of order | Network out of order | Network resource | 0 |
| 41 | Temporary failure | Temporary failure | | |
| 42 | Switching equipment congestion | Switching equipment congestion | S-resource lack | 0 |
| 43 | Access information discarded | Access information discarded | | |
| 44 | Requested circuit/channel not available | Requested circuit/channel not available | S-resource lack | 0 |
| 45 | No VPCI/VCI available | No VPCI/VCI available | S-resource lack | 0 |
| 47 | Resource unavailable. unspecified | Resource unavailable. unspecified | Other causes | 0 |
| C01 1 | Service or option not | available | | |
| 49 | Quality of service unavailable | Quality of service unavailable | Service available | |
| 50 | Requested facility not subscribed | Requested facility not subscribed | | |
| 55 | Incoming calls barred with CUG | Incoming calls barred with CUG | | |
| 57 | Bearer capability not authorized | Bearer capability not authorized | | |
| 58 | Bearer capability not presently available | Bearer capability not presently available | | |
| 63 | Service or option not available. unspecified | Service or option not available. unspecified | | |

FIG. 3C

| | | |
|---|---|---|
| 65 | zearer capability not implemented | zearer capability not implemented |
| 66 | Channel type not implemented | Channel type not implemented |
| 69 | Requested facility not implemented | Requested facility not implemented |
| 70 | Only restricted digital information bearer capability is available | Only restricted digital information bearer capability is available |
| 73 | Unsupported combination of traffic parameters | Unsupported combination of traffic parameters |
| 79 | service or option not implemented, unspecified | service or option not implemented, unspecified |
| C10 1 | invalid message (e.q. parameter out of range) | |
| 81 | Invalid call reference value | Invalid call reference value |
| 82 | Identified channel does not exist | Identified channel does not exist |
| 83 | a suspended call exist, but this call identify does not | a suspended call exist, but this call identify does not |
| 84 | call identity in use | call identity in use |
| 85 | no call suspended | no call suspended |
| 86 | call having the requested call identity has been cleared | call having the requested call identity has been cleared |
| 87 | called user not member of CUG | called user not member of CUG |
| 88 | Incompatible destination | Incompatible destination |
| 89 | Invalid endpoint reference value | Invalid endpoint reference value |

FIG. 3D

| | | | |
|---|---|---|---|
| 91 | Invalid transit network selection | | Invalid transit network selection |
| 93 | AAL parameters cannot be supported | | AAL parameters cannot be supported |
| 95 | Invalid message, unspecified | | Invalid message, unspecified |
| Cll 0 | Protocol error (e.g. unknown message) | 6P | |
| 96 | Mandatory information element is missing | | Mandatory information element is missing |
| 97 | Message type non-existent or not implemented | | Message type non-existent or not implemented |
| 98 | ?? | | ?? |
| 99 | Information element non-existent or not implemented | | Information element non-existent or not implemented |
| 100 | Invalid information element contents | | Invalid information element contents |
| 101 | Message not compatible with call state | | Message not compatible with call state |
| 102 | Recovery on timer expire | | Recovery on timer expire |
| 103 | parameter not-existent or not implemented-passed on | | parameter not-existent or not implemented-passed on |
| 111 | Protocol error, unspecified | | Protocol error, unspecified |
| Cll 1 | interworking | | |
| 106 | interworking, unspecified | | interworking, unspecified |

RARE PROBABILITY CONNECTION CALL REGISTRATION METHOD USING INCOMPLETE CALL CAUSATION MESSAGE FOR ASYNCHRONOUS TRANSFER MODE SWITCHING SYSTEM

BACKGROUND OF THE INVENTION

1. Field of the Invention

The present invention relates to a rare probability connection call registration method using an incomplete call causation message for an asynchronous transfer mode (ATM) switching system, particularly for an ATM switching system which is capable of classifying the causes of the incomplete call by using the cause field within the release message in which the call release cause is registered in detail, and setting the call as an RPCC only when the resource of the relay switching system is lacking, or when the subscriber is on the line, to thus more accurately control the network, whereby it is possible to maximize the efficiency of the network resource by restricting the ineffective call.

2. Description of the Conventional Art

Most traffic congestion in a communication network occurs due to an overload in a receiving system. This communication congestion or overload of the switching system occurs due to the natural disasters, when too many call services are requested at one time, or when communication traffic is concentrated on a specific receiving system thus forming an unexpected communication failure.

When many calls are concentrated at a predetermined time at a specific receiving system (for example, reservations for public performance, or the audience response rating in a very hot television program is broadcasted), the above-described heavy call concentration phenomenon may occur even though an operator of the switching system predicts such heavy call congestion if some special operation preparations are not made on the system.

When call requests are heavily concentrated on a predetermined receiving number, that is when a large number of calls concentrated on the destination, beyond the design specification of the connection Admission Control function, the system can only offer limited service, and the system may go down due to the above-described problems.

Figure 2:
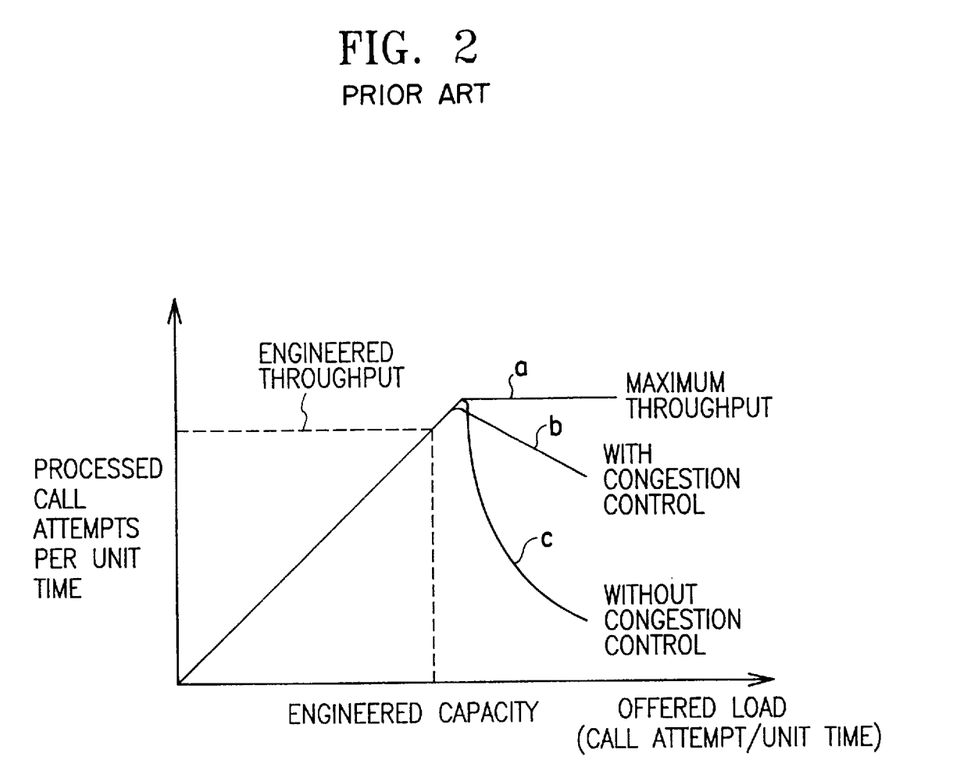
FIG. 2 is a graph illustrating a performance variation when a conventional switching system is overloaded.
Figure 3A:
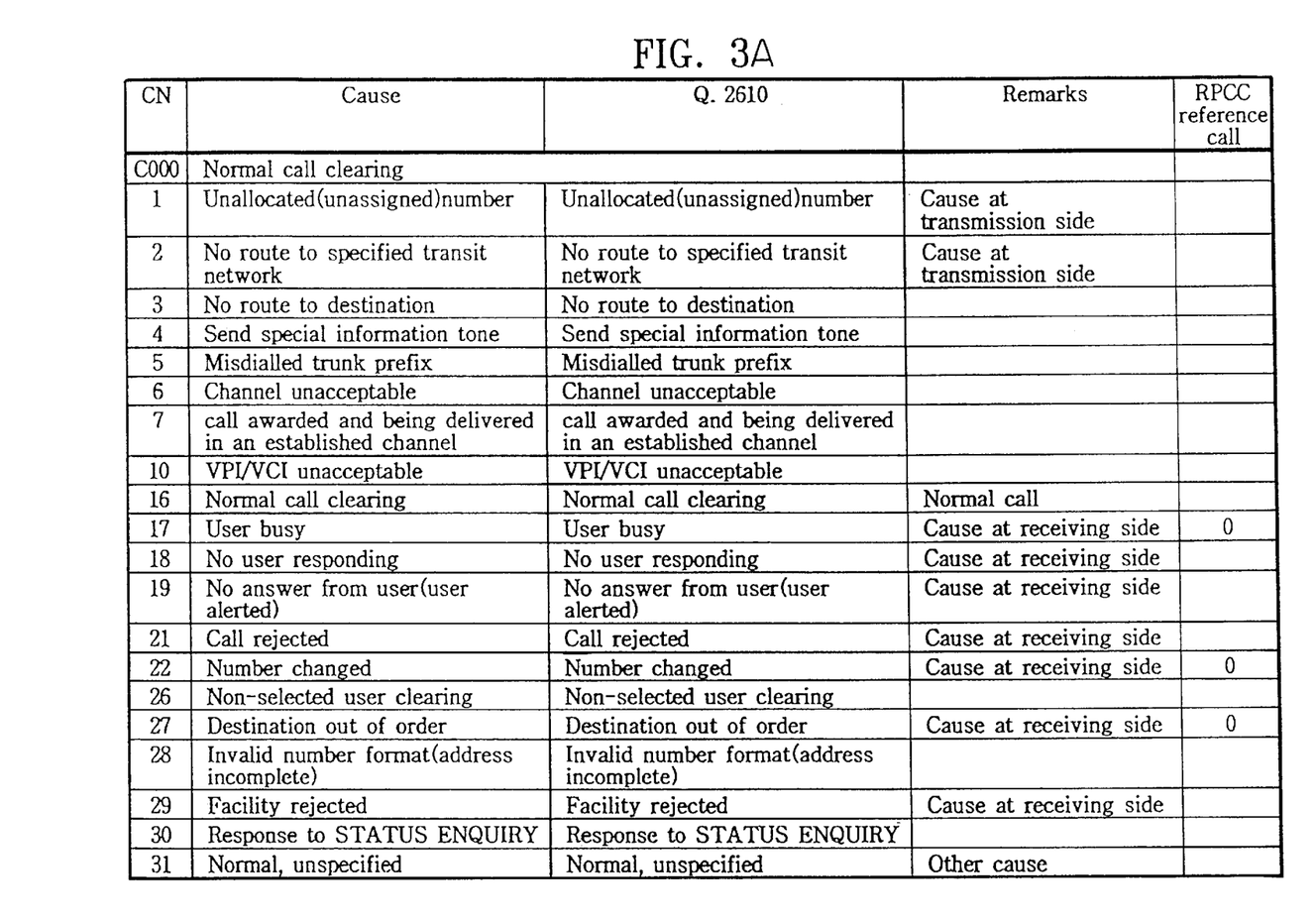
FIG. 3 is a table illustrating a call service completion or a call service termination cause after a termination.
Figure 3B:
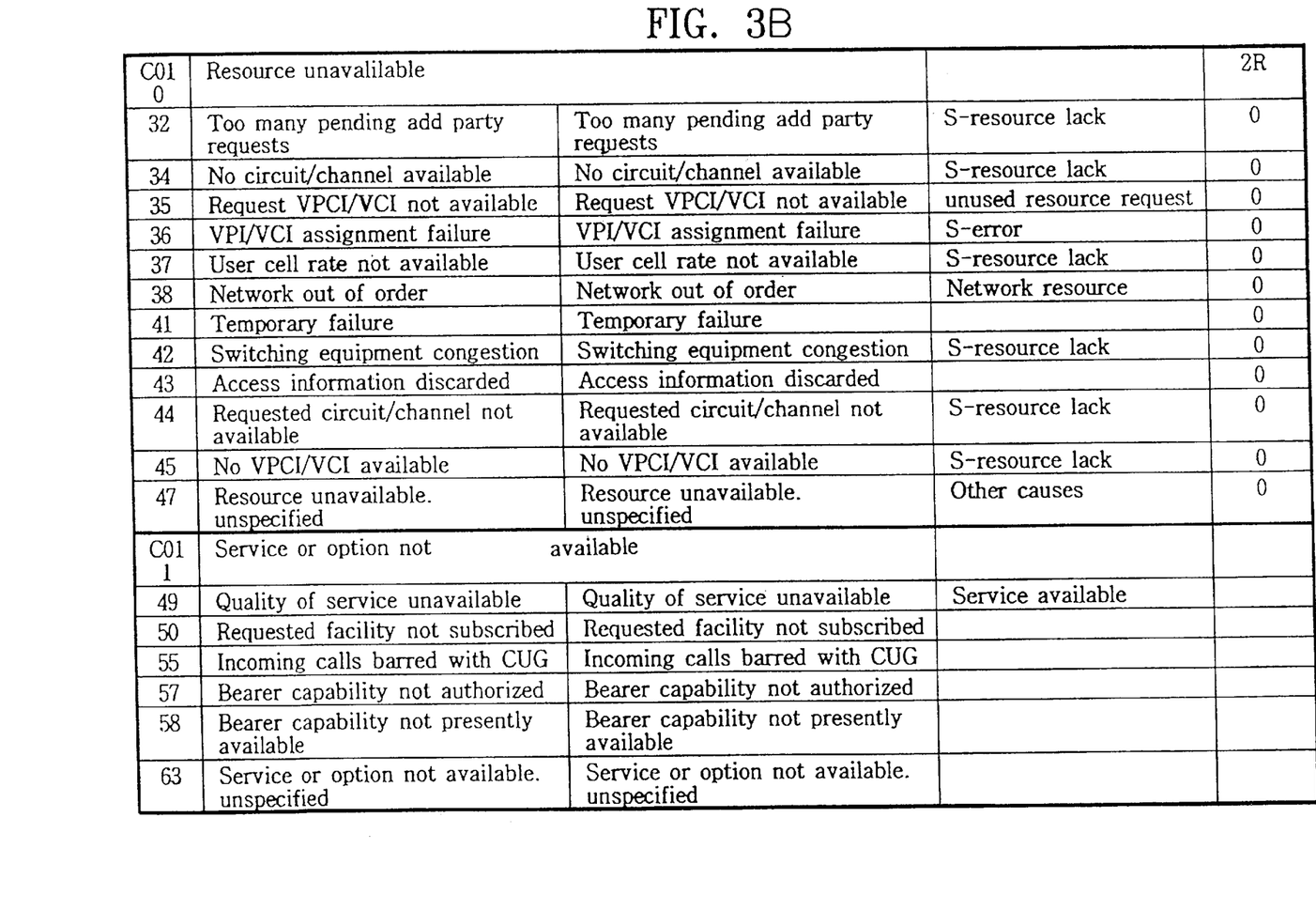
Figure 3C:
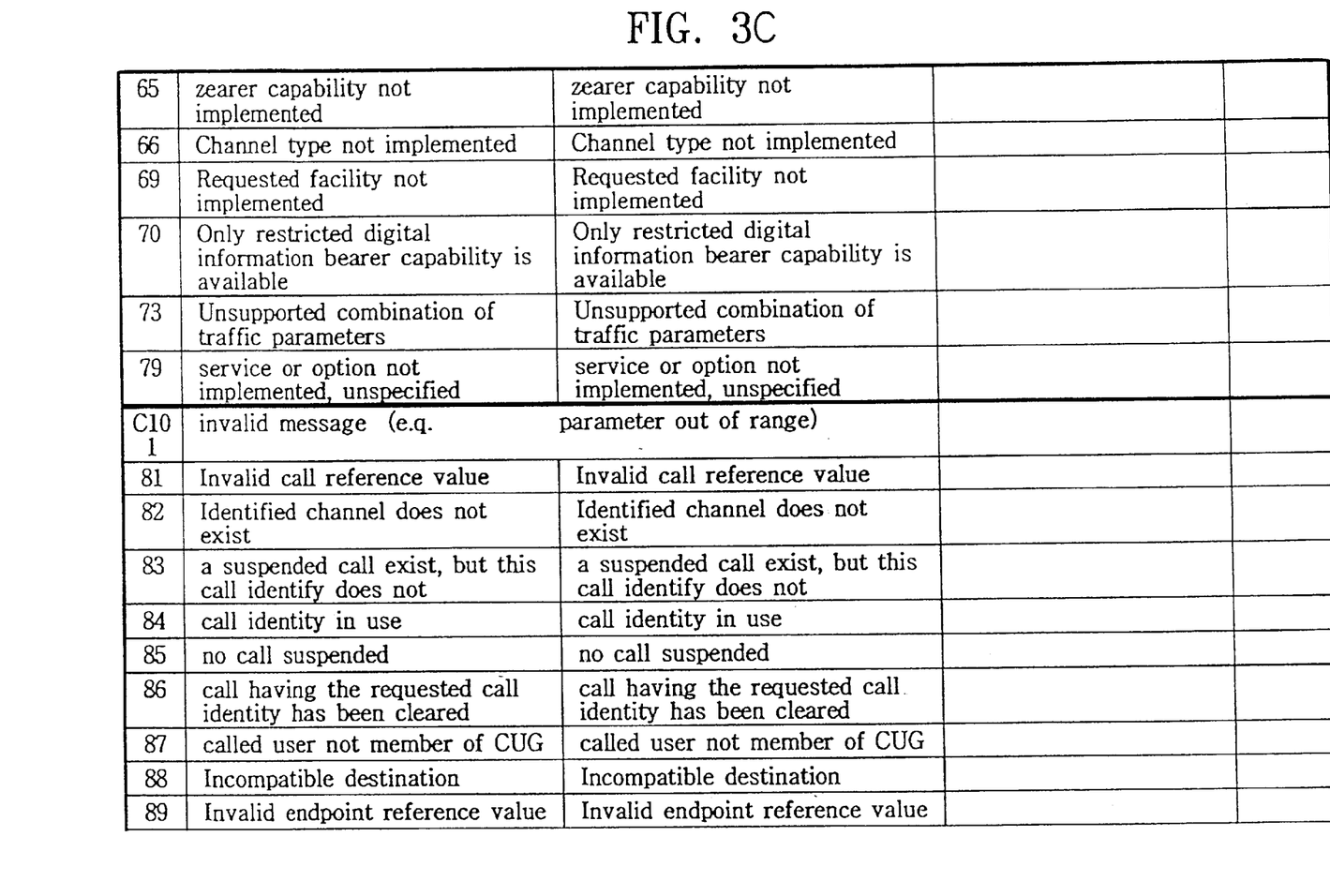
Figure 3D:
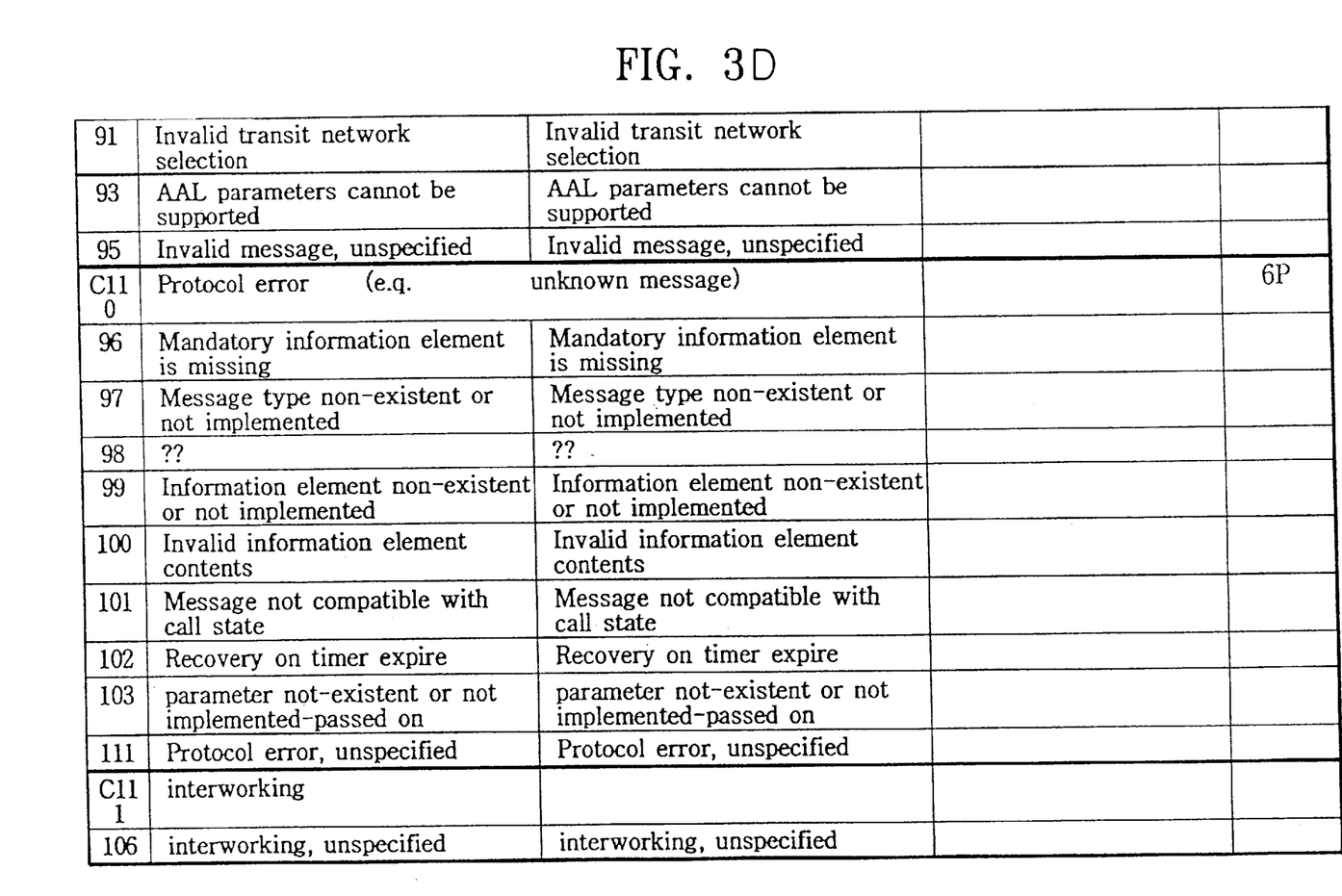

FIG. 2 is a graph illustrating a performance variation when a switching system is overloaded.

As shown therein, the curved line "a" indicates a theoretical system performance which is obtainable when an overload of the system occurs or call traffic congestion occurs, and the curved line "c" denotes a system performance when the congestion control function is not operated, and the curved line "b" denotes the affordable system performance when the congestion control function is operated.

If the above-described situation is continuously maintained, the system congestion from many call attempts concentrated on a specific number may cause further congestion in a neighboring system, thus possibly culminating in a system-wide failure.

In order to overcome the above-described problems, a conventional public switched telephone network (PSTN) is directed to check a traffic completion ratio with respect to a candidate code (traffic received in a specific code of a predetermined system) that the operation input, and when a call completion ratio of a corresponding code is less than a predetermined threshold value, the call with respect to the corresponding code is controlled.

Such method is directed to maximizing the efficiency of the network so that system resources may be evenly distributed by detecting a receiving code in which the call completion ratio is lower than that of a normal call, and controlling the receiving code in a transmitter in which a desired call attempt is possible or the switching system near a transmitting terminal. Here, a call for which the completion ratio is lower is called a rare probability of a connection call (RPCC).

For conventional PSTN, the causes of incomplete calls are as follows. First, when the relay lines to a corresponding number from a first transmitter are all used, or when the switching resource of the transmitter (such as a call mixer, and a tone generator from resources of the communication) are scarce, the incompletion may occur. Second, a call is sometimes not connected due to the lack of switching resources of the relay system including the receiving system, and thus the incompletion may occur. Third, when a subscriber is on the line with another subscriber, or when the subscriber does not respond to the call, the incompletion may occur. Fourth, when the call is timed-out by the transmitting side of the subscriber, or when the subscriber ends the call, the incompletion may occur.

The transmitter processes the call attempt as an incomplete call by informing the transmitting side or the switching system of a ring back tone in the above-described state. However, when judging all of the call tone or the non-response of the subscriber to be in the RPCC, there may occur numerous system errors because RPCC means that the call completion ratio is lower with respect to a specific receiving signal. Therefore, it is necessary to measure the statistic value by the incomplete call due to the cause made by the destination side of the subscriber by classifying the call services by a failure cause.

In addition, when performing a function based on the candidate code, since the control is performed after a predetermined time after the operator inputs a predetermined code, it is impossible to prevent the call connection problems due to an unpredictable and sudden failure of the system in conventional method.

SUMMARY OF THE INVENTION

Accordingly, it is an object of the present invention to provide an improved rare probability connection call registration method using an incomplete call causation message for an asynchronous transfer mode switching system which overcomes the problems encountered in the conventional art.

It is another object of the present invention to provide an improved rare probability connection call registration method using an incomplete call causation message for an asynchronous transfer mode switching system which is capable of classifying the incompletion causes by using the cause field in the release message in which the call release cause is registered in detail, and setting the call as an RPCC only when the resource of the relay switching system is lacking, or when the subscriber is on the busy line, to thus more accurately control the network, whereby it is possible to maximize the efficiency of the network resource by restricting the ineffective call.

To achieve the above objects, there is provided an improved rare probability connection call registration method using an incomplete call causation message for an asynchronous transfer mode switching system which includes the steps of receiving a candidate code from an operator and classifying a normal call and an abnormal call with respect to each call when a call cause message is received, increasing the number of completed calls when the received call is completed normally, judging whether an incomplete call occurred due to the lack of a switching resource of the busy line of the subscriber at a desired destination, terminating the call when an abnormal cause is due to another cause except for the lack of the switching resource, or the busy line state of the subscriber, increasing the number of the incomplete calls when the call is incompletely terminating due to the lack of the switching resource or the busy line state of the subscriber, checking the call completion ratio, termination the call when the call completion ratio is greater than a predetermined threshold value that the operator designated, registering the call as the RPCC, informing the resultant operation of the operator terminal, and requesting call control with respect to the corresponding code.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limiting of the present invention, and wherein.

DETAILED DESCRIPTION OF THE INVENTION

Figure 1:
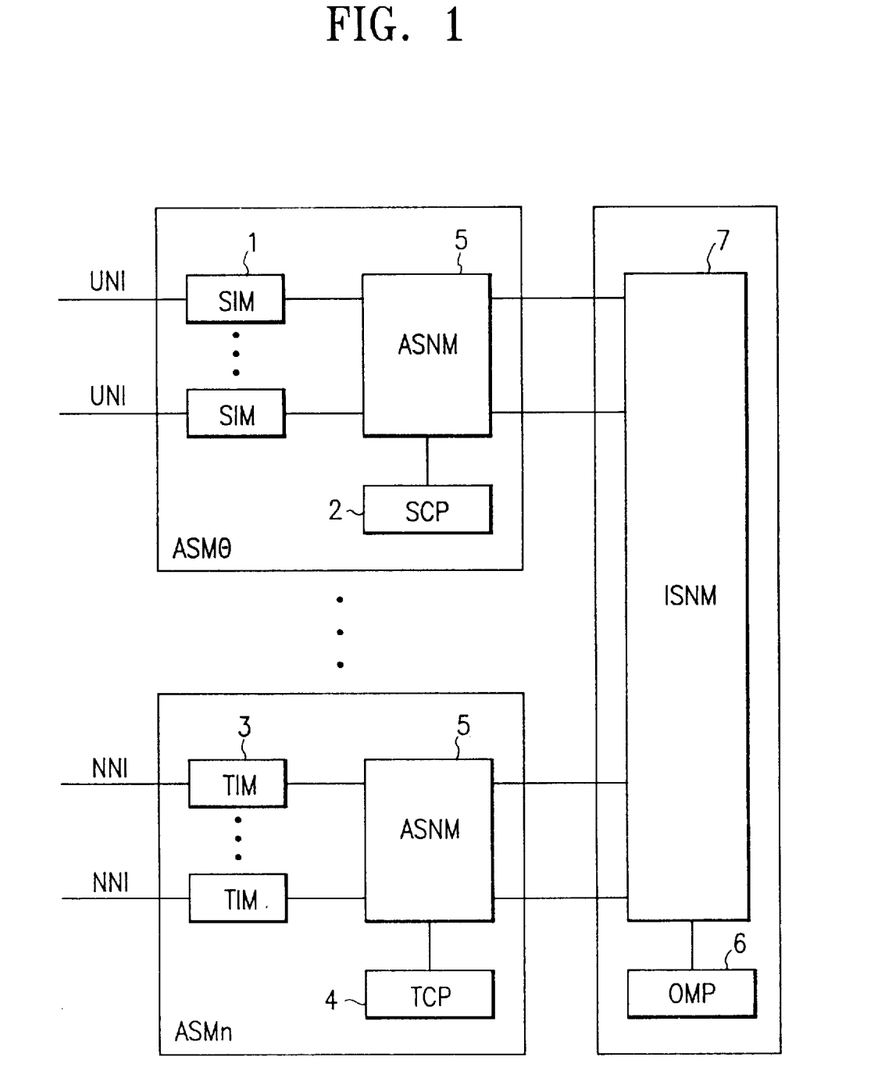
FIG. 1 is a block diagram illustrating an asynchronous transfer mode (ATM) switching system according to the present invention.

FIG. 1 is a block diagram illustrating an asynchronous transfer mode (ATM) switching system according to the present invention.

As shown therein, a subscriber call processor 2 is a processor for making a call using a user network interface (UNI) protocol and controls an entire traffic operation such as a call receiving control, and a usage parameter control (UPC) in cooperation with a subscriber interface module (SIM) 1.

A trunk call processor (TCP) 4 performs call processing with a network using a network node interface (NNI) protocol, performs call connection control with respect to an input relay and output relay call in cooperation with a trunk interface module (TIM) 3, and serves to control functions which are necessary for an interface with the network.

An operation and maintenance processor (OMP) 6, which controls an operation- and maintenance-related function for the system, is a processor for performing a charging process, a statistic process, a maintenance, a management function, etc.

An access switch network module (ASNM) 5 is a self-routing switching in which there is no blocking in the switching system for transmitting a basic unit cell of the ATM, and performs a line concentration function having a predetermined line concentration ratio in accordance with the configuration system.

An interconnection switch network module (ISNM) 7 is a self-routing switch which is used as an interconnector between ATM switching modules (ASM).

Figure 4:
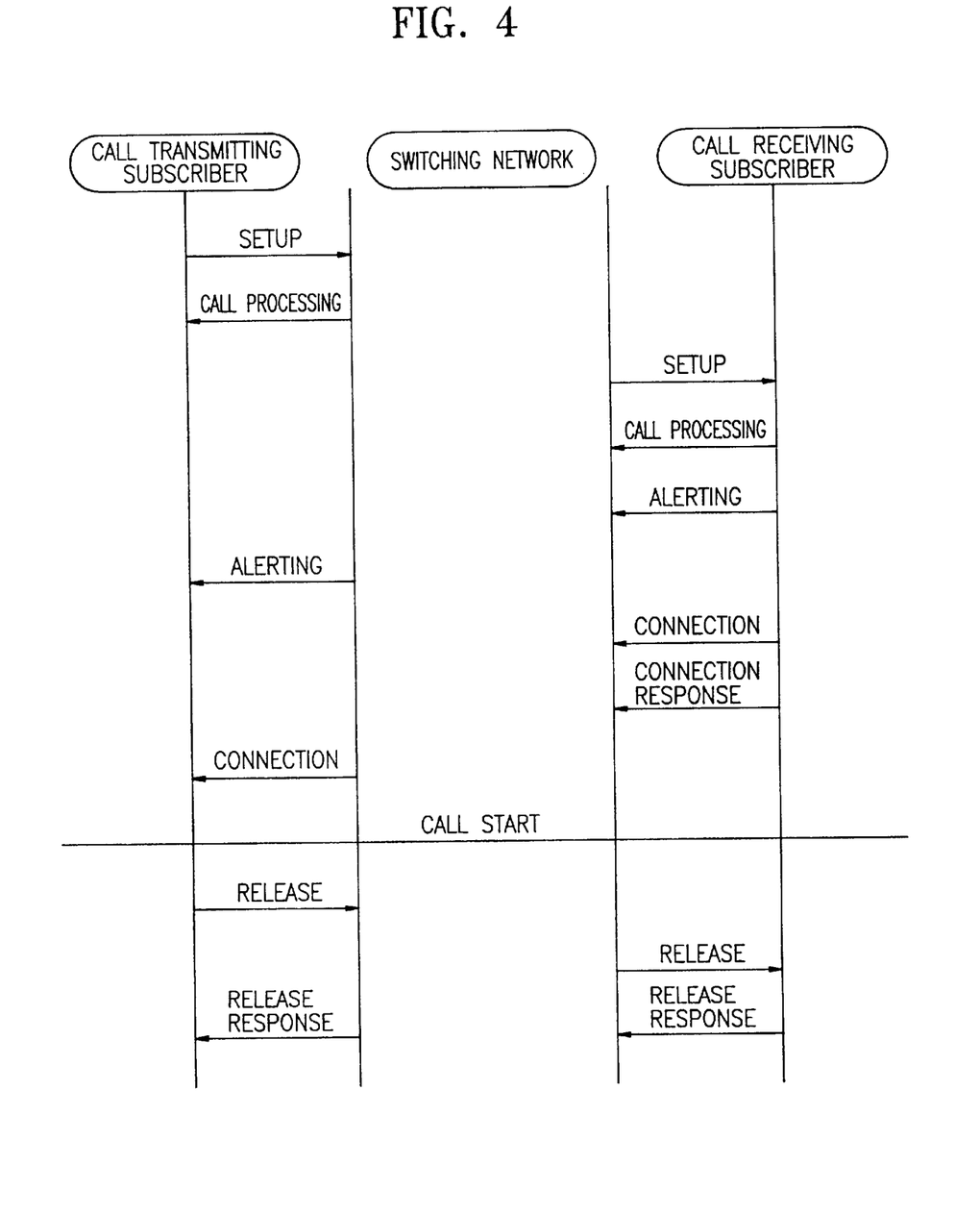
FIG. 4 is a flow chart illustrating a process of a signal message according to the present invention.

FIG. 3 is a table illustrating a call service completion or call service termination cause after a termination, and FIG. 4 is a flow chart illustrating a process of a signal message according to the present invention.

A setup message is transmitted to the switching system during a call attempt by a subscriber, and in the switching system, a call processing message is transmitted to the subscriber if a relay line bandwidth exists with respect to the receiving number which the subscriber wants.

The setup message is transmitted to the subscriber (a destination side) through the relay system, an altering message is transmitted if the subscriber has the same attribute of the terminal of the transmitting side of the subscriber. Thereafter, call service is attempted if a connection and a connecting response message are set up.

In addition, when a call reception or a call transmission are finished, a release message is transmitted, and the message as shown in FIG. 3 is transmitted to the cause field indicating the call termination cause.

After the setup message is transmitted, a network or a subscriber can always transmit a release message. Namely, when the subscriber terminated a call attempt during the call connection, or when the subscriber cannot receive the call request, the network can terminate the call attempt. For example, if the subscriber missed information which must be sent, the transmitting switching system terminates the call by carrying the information of the error message 96 as shown in FIG. 3 on the release message. In this case, the incomplete call is not RPCC.

Figure 5:
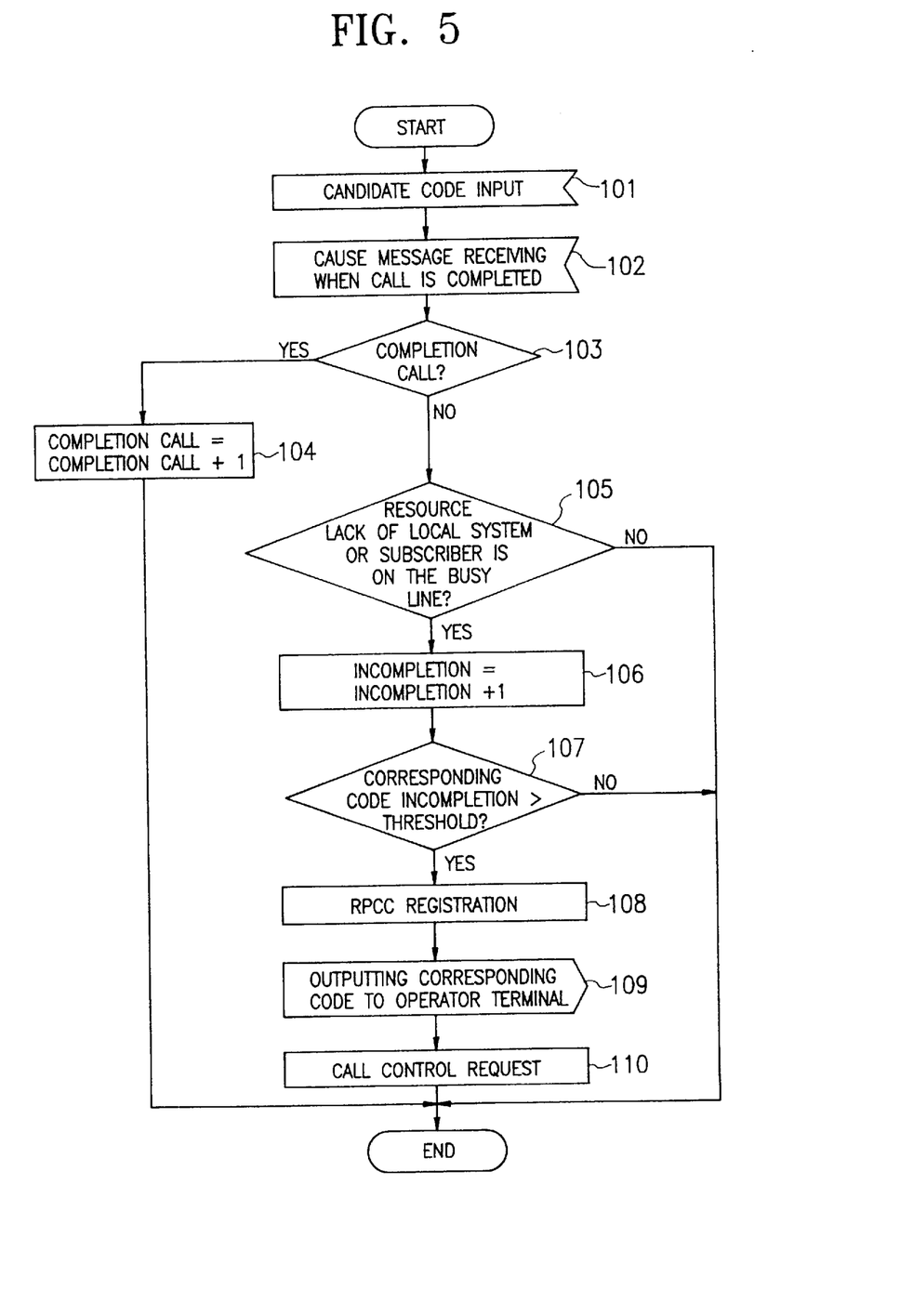
FIG. 5 is a flow chart illustrating a rare probability connection call registration method according to the present invention.

FIG. 5 is a flow chart illustrating a rare probability connection call registration method according to the present invention.

In the present invention, a candidate code is input from the operator in step 101. The call completion ratio measurement is performed as follows as a statistic function with respect to the corresponding code. When the call service is completed, a call cause message is received in step 102. The normal call completion and incomplete call completion with respect to each call are classified in step 103.

If the call received is normally completed, the number of completions is increased by "1" in step 104. In the case of the abnormal state, the cause thereof is checked, or it is judged whether the call incompletion is obtained due to the lack of the switching resource or the busy state of the call destination.

When the incompletion is not caused by the above-described causes, the call is terminated. When the incompletion is caused by the above-described causes, the number of the incompletions is increased by "1" in step 106, and it is judged whether the number of the incompletions of the corresponding code is greater than a predetermined threshold value in step 107. The call completion ratio for the RPCC registration is computed as follows.

The call completion ratio=(the number of completed calls)/{the total number of transmissions−(the number of incomplete calls except for the lack of the switching resource)}.

If the call completion ratio is greater than the threshold value that the operator designated, namely, when the number of incomplete calls is less than the threshold value, the call is terminated. If the call completion ratio is less than the threshold value that the operator designated, the call is registered in the RPCC in step 108, and is informed to the operator through the operator terminal in step 109, and the call control with respect to the corresponding code is requested in step 110.

Thereafter, the corresponding code is continuously checked. If the call completion ratio is greater than the threshold value, the RPCC is released, and the control with respect to the call signal to the corresponding code is released.

As described above, the rare probability connection call registration method using an incomplete call causation message for an asynchronous transfer mode switching system according to the present invention is directed to classifying the incompletion causes by using the cause field in the release message in which the call release cause is registered in detail, and setting the call as an RPCC only when the resource of the relay switching system is lacking, or when the subscriber is busy, to thus more accurately control the network, whereby it is possible to maximize the efficiency of the network resource by restricting the ineffective call.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A rare probability connection call RPCC registration method using an incomplete call causation message for an asynchronous transfer mode switching system, said method comprising the steps of:

receiving a candidate code from an operation and classifying each received call as being either normal or abnormal when a call cause message is received;

increasing the number count of completed calls when a received call is completed normally, and judging whether an incompleted call occurred due to a lack of switching resources or a busy state of the subscriber at a destination when the call is classified as abnormal;

terminating the call when the call being classified as abnormal is due to a cause other than the lack of switching resources or the busy state of the subscriber;

increasing the number count of incomplete calls when the call is incompletely terminated due to the lack of switching resources or the busy state of the subscriber, and checking the ratio of completed calls to incompleted calls; and terminating the call when the call completion ratio is greater than a predetermined threshold value, registering the call as RPCC, informing the resultant operation of the operator terminal, and requesting call control with respect to the corresponding code.

2. The method of claim 1, further comprising a step for checking a code registered as RPCC, releasing the RPCC when the call completion ratio is greater than the threshold value and the control with respect to the receiving signal to the corresponding code.

3. The method of claim 2, wherein said call completion ratio is computed by an expression "(the number of completed calls)/{the total number of call transmissions−(the number of incomplete calls except for the lack of switching resources)}".

* * * * *